US012583085B2

(12) United States Patent
Yoshikane et al.

(10) Patent No.: US 12,583,085 B2
(45) Date of Patent: Mar. 24, 2026

(54) DRIVING TOOL

(71) Applicant: MAKITA CORPORATION, Anjo (JP)

(72) Inventors: Kiyonobu Yoshikane, Anjo (JP); Toshiya Murakami, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/923,937

(22) Filed: Oct. 23, 2024

(65) Prior Publication Data

US 2025/0162116 A1 May 22, 2025

(30) Foreign Application Priority Data

Nov. 22, 2023 (JP) ................................ 2023-198036

(51) Int. Cl.
*B25C 1/04* (2006.01)
*B25F 5/00* (2006.01)

(52) U.S. Cl.
CPC .............. *B25C 1/047* (2013.01); *B25C 1/041* (2013.01); *B25F 5/006* (2013.01)

(58) Field of Classification Search
CPC ...................................................... B25C 1/047
See application file for complete search history.

(56) References Cited

U.S. PATENT DOCUMENTS

| | | | | |
|---|---|---|---|---|
| 9,950,415 | B2 * | 4/2018 | Takeuchi | B25D 11/00 |
| 10,730,172 | B2 * | 8/2020 | Po | B25C 1/047 |
| 11,224,960 | B2 | 1/2022 | Garces et al. | |
| 2021/0308852 | A1 * | 10/2021 | Ueda | B25C 1/06 |

* cited by examiner

*Primary Examiner* — Nathaniel C Chukwurah
(74) *Attorney, Agent, or Firm* — Oliff PLC

(57) ABSTRACT

A driving tool includes a driver, and a piston connected to the driver. The piston and the driver are housed within a cylinder such that the piston slidably moves within the cylinder by gas active pressure. The cylinder is positioned in an adjoining arear of an axis line of the piston. The cylinder is made of iron. Accordingly, a weight in the adjoining arear of the axis line of the piston is more than a cylinder made of aluminum or resin. Because of the large weight in the adjoining area of the axis line of the piston, a reaction force against a movement of the piston and a driving of the driver can be effectively restrained.

18 Claims, 7 Drawing Sheets

DRIVING TOOL

CROSS-REFERENCE TO RELATED APPLICATION

This application claims priority to Japanese patent application serial number 2023-198036, filed on Nov. 22, 2023, the contents of which are incorporated herein by reference in their entirety for all purposes.

TECHNICAL FIELD

The present invention generally relates to a driving tool for driving a driving member, such as a nail or a staple, into a workpiece, such as, for example, a wooden material.

BACKGROUND

For example, a driving tool, which includes a piston that moves within a cylinder in an up-down direction and a driver that is integrally connected to the piston, is well known. The piston and the driver integrally move in a driving direction owing to a pressure of the gas filled in an accumulation chamber disposed above the cylinder. The driver moving in the driving direction drives a driving member, such as a nail or a staple, thereby ejecting the driving member from an ejection port into a workpiece, such as a wooden material. In the driving operation, a counterforce is generated in a tool main body when the piston moves in the driving direction and the driver drives the driving member.

The counterforce acts in a direction opposite to the driving direction (anti-driving direction). Owing to the counterforce, a force that rotates the tool main body relating to a grip for a user to hold is produced. The counterforce generated each time the driving member is driven applies a load to the user. Sometimes, it may happen that a posture of the driving tool is not properly maintained. Accordingly, there is a concern that a driving member is deviated from a driving surface of the driver, or the ejection port rises from the workpiece. In such cases, the driving member is not properly driven into the workpiece.

Thus, there is a need for a driving tool in which an influence of the counterforce occurred each time a driving operation is performed can be reduced.

SUMMARY OF THE DISCLOSURES

According to one aspect of the present disclosure, a driving member includes a driver that drives a driving member in a driving direction. A piston connects to the driver. A cylinder houses the driver and the piston such that the piston is slidably movable within the cylinder by gas active pressure. The cylinder is made of iron. Accordingly, the cylinder is on or in a adjoining area of an axis line of the piston that moves therealong. Since the cylinder is made of iron, a weight in the vicinity of the axis line of the piston becomes large in comparison with a case where the cylinder is made of aluminum or resin. Because of large weight in the vicinity of the axis line of the piston, a reaction force against the movement of the piston and a driving of the driver can be restrained. Thus, a reaction force occurred when driving the tool can be effectively restrained.

DETAILED DESCRIPTION

Figure 1:
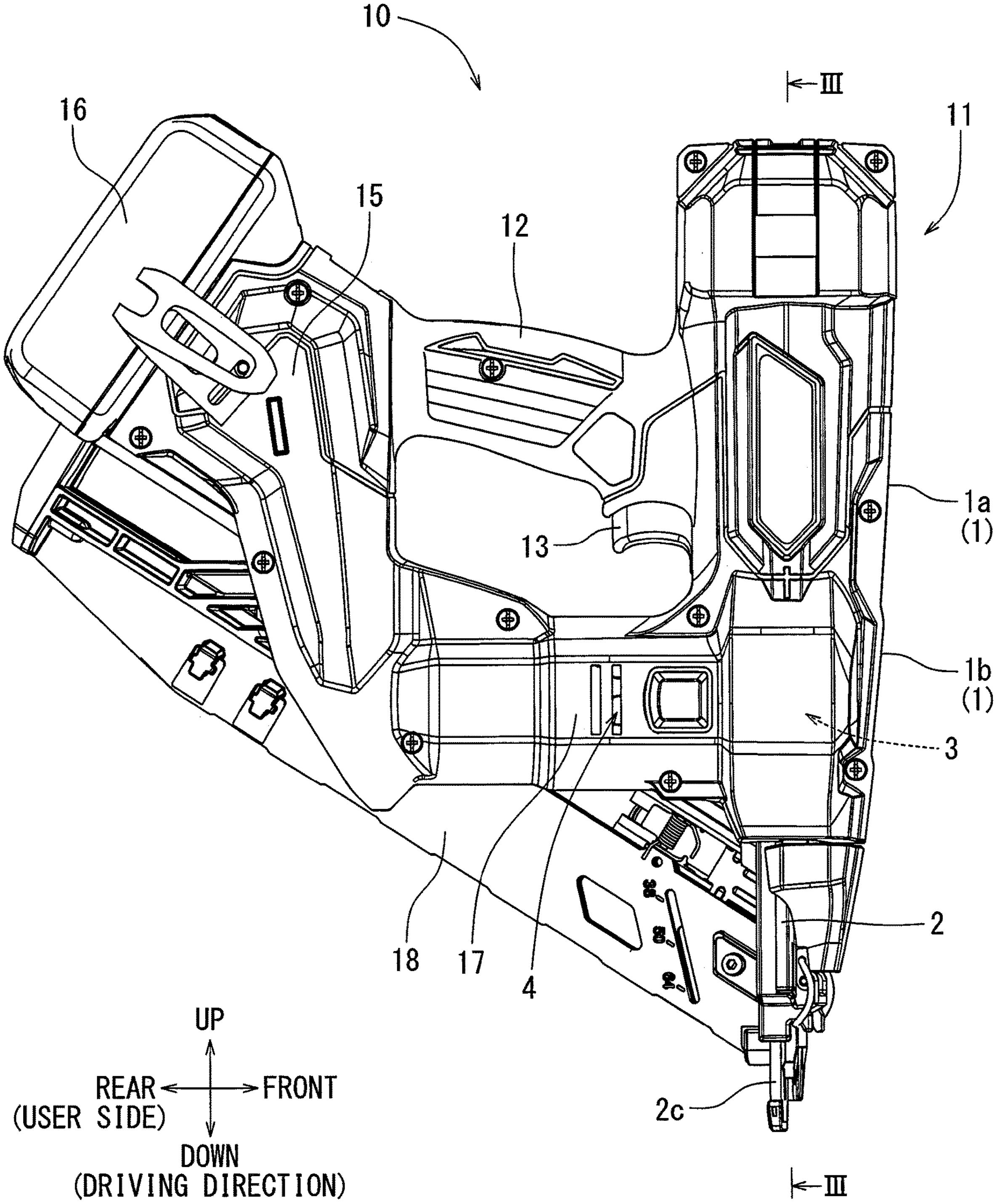
FIG. 1 is a right side view of a driving tool according to a first embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to one aspect of the present disclosure, the cylinder includes an inner circumferential surface along which the piston is slidably held. A surface treatment is not applied to the inner circumferential surface of the cylinder. Since the cylinder is made of iron, an intensity of the cylinder can be appropriately maintained without applying the surface treatment to the inner circumferential surface of the cylinder. Accordingly, a process for applying the surface treatment to the cylinder can be saved.

According to another aspect of the present disclosure, a heat treatment is applied to the cylinder. Accordingly, an intensity of the cylinder can be further improved.

According to another aspect of the present disclosure, a driving tool includes a driver that drives a driving member in a driving direction. The driver is coupled to a piston. A cylinder houses the driver and the piston such that the piston slidably moves within the cylinder by gas active pressure. A housing has a cylinder and is tubular-shaped and extends in a longitudinal direction of the cylinder. The housing has a weight member that puts more weight on the housing. Accordingly, the housing is in an adjoining area of an axis line of the piston that moves therealong. Owing to a presence of the weight member, a weight of the housing becomes large. Because of the large weight in the adjoining area of the axis line of the piston, a reaction force against a movement of the piston and a driving of the driver can be restrained. Thus, a reaction force occurred when driving the tool is effectively restrained.

According to another aspect of the present disclosure, the weight member is arranged around the cylinder within a range where the cylinder extends along the longitudinal direction of the cylinder. Accordingly, the weight member can be reliably arranged in the vicinity of the axis line of the piston. Owing to the weight member, a reaction force occurred when a driving operation of the driving tool is performed can be effectively restrained.

According to another aspect of the present disclosure, the weight member is fixed to an inner wall of the housing. In other words, the weight member is integrally attached to the housing. Accordingly, the weight member is not disengaged from the housing, and thus the weight member does not become loose within the housing.

According to another aspect of the present disclosure, a grip extends from the housing in a rearward direction approximately perpendicular to the longitudinal direction of the cylinder. The weight member is arranged such that a weight center of the weight member is positioned on a front side of a center line of the housing in the front-rear direction. In other words, the weight member is positioned such that a weight of the weight member on a side opposite to the grip relating to the housing becomes large. Accordingly, a weight balance of the driving tool in the front-rear direction can be appropriately and stably maintained. As a result, a deviation of the driving tool in the front-rear direction, which is caused by a reaction force occurred when a driving operation of the driving tool is performed, can be effectively restrained.

According to another aspect of the present disclosure, the grip extends from the housing in a rearward direction approximately perpendicular to the longitudinal direction of the cylinder. The lifter moves the driver in a direction opposite to the driving direction. The lifter is disposed on a first side of either a left or right side of a center line of the grip in the left-right direction approximately perpendicular to a direction in which the grip extends. The weight member is arranged such that a weight center of the weight member is positioned on a second side opposite to the first side relating to the center line of the grip in the left-right direction. In other words, the weight member is arranged such that a weight of the weight member, which is on a side opposite to the first side where the lifter is arranged, becomes large. Because of this configuration, a weight balance of the driving tool around the grip in the left-right direction can be appropriately and stably maintained. Accordingly, a deviation of the driving tool in the left-right direction, which is caused by a reaction force occurred when a driving operation of the driving tool is performed, can be effectively restrained.

Next, a first embodiment of the present disclosure will be explained with reference to FIGS. 1 to 3. FIG. 1 shows a gas-spring type driving tool 10 in which a driving member is driven utilizing a pressure of the gas. In the following explanation, a driving direction of the driving member is defined as a downward direction, and a direction opposite to the driving direction is an upward direction. In FIG. 1, a user holding the driving tool 10 by hand is situated on a rear side of the driving tool 10. In other words, a rearward direction is defined as a user side. A direction opposite to the user side is a forward direction. A leftward/rightward direction is based on a user's position.

As shown in FIG. 1, the driving tool 10 includes a tool main body 11. The tool main body 11 includes an approximately tubular housing 1. A grip 12 for a user to hold is arranged on a rear side of an upper portion la of the housing 1. The grip 12 is formed in an approximately tubular shape. The grip 12 extends in a rearward direction. A battery attachment portion 15 is arranged on a rear side of the grip 12. A battery pack 16 is detachably attached to a rear surface of the battery attachment portion 15. The battery pack 16 is attached to the battery attachment portion 15 by sliding the battery pack 16 obliquely rearward and downward along the rear surface of the battery attachment portion 15. The battery pack 16 removed from the battery attachment portion 15 can be recharged by a dedicated charger for repeated use. The battery pack 16 can be used as a power source for another electric driving tools. The battery pack 16 supplies power to a driving section 4 which is discussed later.

Figure 2:
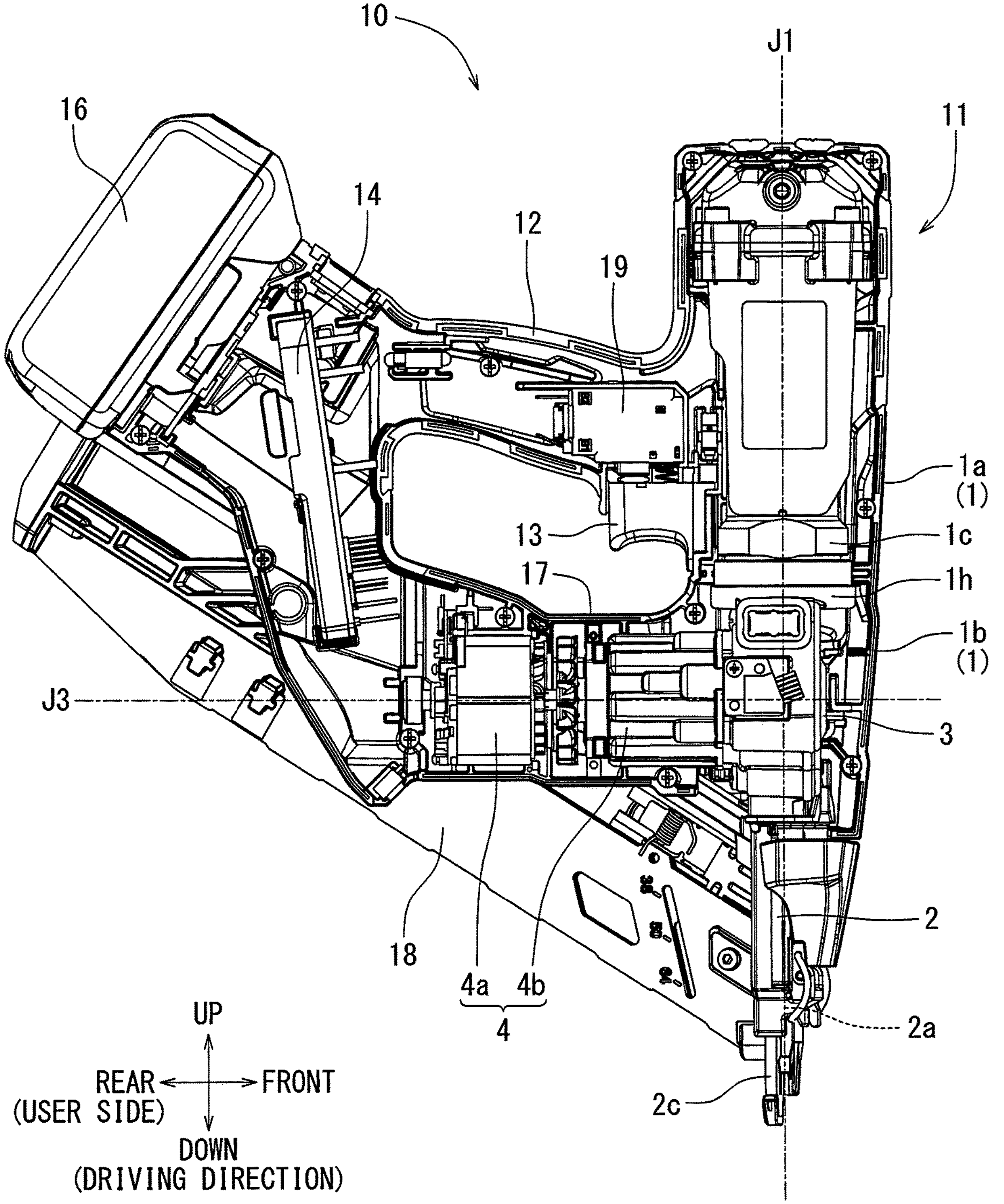
FIG. 2 is a right side view of the driving tool from which a right side housing is removed.

As shown in FIGS. 1 and 2, the battery attachment portion 15 is a box-shaped member extending in an up-down direction. A controller 14 is housed within the battery attachment portion 15. An approximately tubular driving section case 17 is integrally combined with the battery attachment portion 15 at a lower front surface of the battery attachment portion 15. The driving section case 17 extends in the front-rear direction. A front portion of the driving section case 17 is integrally combined with a housing lower portion 1*b* of the housing 1 at a rear portion of the housing lower portion 1*b*. The driving section 4 is housed within the driving section case 17. The driving section 4 includes a motor 4*a* serving as a driving source and a reduction gear train 4*b* that is connected to the motor 4*a*. The motor 4*a* is housed in the driving section case 17 such that an axis line (motor shaft axis line J3) extends in the front-rear direction.

As shown in FIG. 2, a trigger 13, which is pulled by a user's fingertip, is arranged on a lower surface of the front portion of the grip 12. A switch 19 is disposed within the grip 12 that is above the trigger 13. When the trigger 13 is pulled, the switch 19 is pushed upward by the trigger 13 to be switched to an on-state. When the switch 19 is switched to the on-state, the switch 19 transmits a signal to a controller 14. The controller 14 drives the motor 4*a* based on the signal transmitted to the controller 14. A rotational output of the motor 4*a* is reduced by the reduction gear train 4*b* to output forward to the lifter 3.

As shown in FIG. 2, a housing upper portion 1*a* of the housing 1 houses a cylinder 1*c* that is made of iron. As shown in FIG. 3, the cylinder 1*c* slidably holds the piston 1*d* within the cylinder 1*c*. The piston 1*d* moves within the cylinder 1*c* in the up-down direction. A heat treatment is applied to the cylinder 1*c*. By applying the heat treatment application to the cylinder 1*c*, an abrasion of the cylinder 1*c* can be reduced owing to the up-down movement of the piston 1*d*. Also, an intensity of the cylinder 1*c* can be improved. Accordingly, application of surface treatment to an inner circumferential surface 1*j* of the piston 1*c* is not especially necessary. In case that the piston 1*c* is made of aluminum, the application of surface treatment to the piston 1*c* may be necessary.

Figure 3:
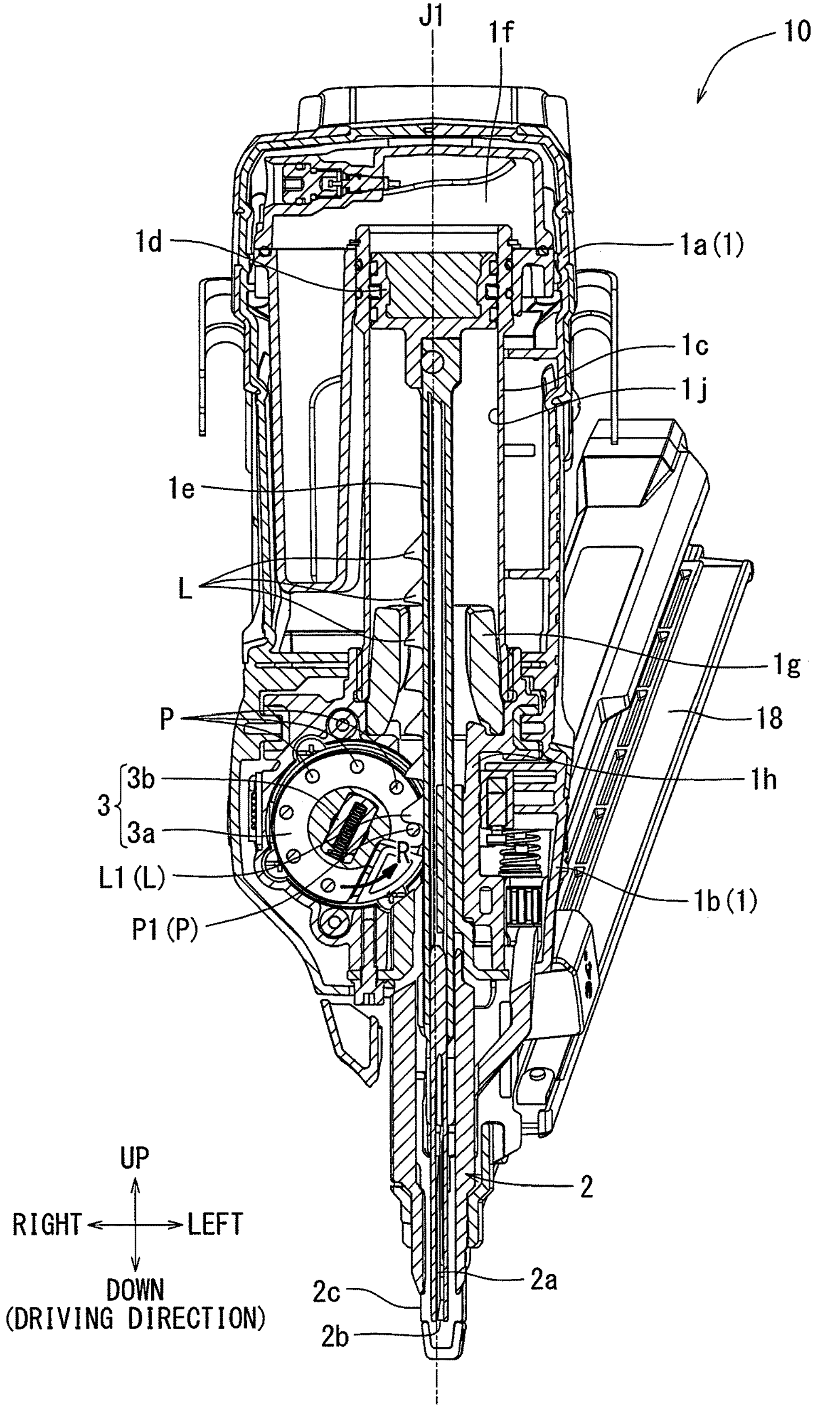
FIG. 3 is a cross-sectional view taken along line III-III of FIG. 1.

As shown in FIG. 3, an upper portion of the cylinder 1*c* above the piston 1*d* communicates with an accumulation chamber 1*f*. A compressed gas such as, for example, air is filled in the accumulation chamber 1*f*. A pressure of the gas filled in the accumulation chamber 1*f* acts as a driving force for moving the piston 1*d* downward (in the driving direction). A driver 1*e* extending in the up-down direction is connected to a lower surface of the piston 1*d*. The driver 1*e* includes a plurality of engaged portions L. Each of the plurality of engaged portions L protrudes rightward from a right side of the driver 1*e* so as to form a rack-shaped tooth. In the first embodiment, seven engaged portions L are arranged at equal intervals along the longitudinal direction (up-down direction) as clearly shown in FIG. 3.

As shown in FIG. 2, the housing lower portion 1*b* houses a lower case 1*h*. As shown in FIG. 3, the lower case 1*h* is connected to a lower portion of the cylinder 1*c*. The lower case 1*h* covers a part of the lower surface of the cylinder 1*c* from the below. A damper 1*g* is disposed on a connection surface of the lower case 1*h* to the cylinder 1*c*. The damper 1*g* is arranged on a lower side of interior of the cylinder 1*c*. The damper 1*g* is made of an elastic member.

As shown in FIG. 3, the lower case 1*h* houses the lifter 3. The lifter 3 is arranged on a right and lower side of the cylinder 1*c*. The lifter 3 includes a rotation shaft 3*b* connected to the driving section 4 as referred in FIG. 2 and a wheel 3*a* supported by the rotation shaft 3*b*. The rotation shaft 3*b* is supported by a bearing (not shown in the figures) so as to be rotatable with respect to the lower case 1*h*. An axis line of the rotation shaft 3*b* is aligned with a motor shaft axis line J3 as referred in FIG. 2. As shown in FIG. 2, when the driving section 4 is activated, the rotation shaft 3*b* and the wheel 3*a* integrally rotate in a direction indicated by an arrow R in FIG. 3(counterclockwise in FIG. 3). The wheel 3*a* is configured to be restricted from rotating in a direction opposite to the direction indicated by the arrow R. The lifter 3 includes a plurality of engagement portions P arranged along an outer circumferential edge of the wheel 3*a*. Each of the plurality of engagement portions P is a cylindrical-shaped shaft member (pin) extending in a front-rear direction. In the first embodiment, seven engagement portions P are arranged in an area of about three-fourths of the wheel 3*a* in a circumferential direction. A remaining area of about one-fourths of the wheel 3*a* is referred to as a relief area where no engagement portion is arranged.

FIG. 3 shows that the driver 1*e* is at a standby position before a driving operation is performed. As shown in FIG. 3, one of the plurality of engaged portions L engages one of the plurality of engagement portions P. At the standby position, a lowermost rack L1 of the plurality of engaged portions L engages a rearmost pin P1 of the plurality of engagement portions P which is at a rear end in a rotational direction of the wheel 3*a*. The rearmost pin P1 engages the lowermost rack L1 from below thereof. The lifter 3 supports the driver 1*e* from below owing to the engagement of the rearmost pin P1 with the lowermost rack La and a rotation restriction of the wheel 3*a* in a clockwise direction. This mechanical configuration holds the driver 1*e* and the piston 1*d* in the standby position against the pressure of the gas that fills the accumulation chamber 1*f*.

As shown in FIG. 3, a lower portion of the driver 1*e* at the standby position enters a nose 2. The nose 2 is made of metal such as, for example, iron, extending in the up-down direction. An upper portion of the nose 2 is housed in the housing lower portion 1*b*. The upper portion of the nose 2 is assembled to the lower case 1*h*. A lower portion of the nose 2 protrudes downward from the housing lower portion 1*b*. The nose 2 includes a driving passage 2*a* extending in the up-down direction. The driving passage 2*a* passes through an axis line JI of the piston 1*d* that moves in the up-down direction. A lower portion of the driver 1*e* enters the driving passage 2*a*. A lower portion of the driving passage 2*a* below the driver 1*e* is loaded with a driving member (not shown).

As shown in FIG. 2, a rear portion of the nose 2 is combined to a magazine 18 that is loaded with a plurality of driving members. A driving member is supplied from the magazine 18 to the driving passage 2*a* one by one such that the driving member extends in the up-down direction. The magazine 18 extends rearward and upward toward a rear side of the tool main body 11. A contact arm 2*c* is arranged at a lower portion of the nose 2 so as to be slidable in the up-down direction. The contact arm 2*c* is spring-biased toward an off position so as to be relatively moved relating to the nose 2. When the contact arm 2*c* is relatively moved upward relating to the nose 2 (to an on position), a pulling operation of the trigger 13 becomes effective.

When a user uses the driving tool 10, the user holds the grip 12 such that the driving tool 10 stands in the up-down direction as shown in FIG. 2. Then, the user pushes the contact arm 2*c* toward a workpiece from above. By this operation, the contact arm 2*c* moves relatively upward relating to the nose 2. Furthermore, when the user pulls the trigger 13, the controller 14 rotates the motor 4*a* in the driving section 4. Rotation of the motor 4*a* is transmitted to the lifter 3 via the reduction gear train 4*b*. As shown in FIG. 3, the rotation shaft 3*b* of the lifter 3 rotates in a direction indicated by an arrow R, thereby rotating the wheel 3*a* in the direction R. When the wheel 3*a* rotates in the direction R, the rearmost pin P1 climbs over and disengages from the lowermost rack L1. Because of this movement, the piston 1*d* moves downward owing to the pressure of the gas filled in the accumulation chamber 1*f*. The driver 1*e* moves downward together with the piston 1*d*. Guided to the driving passage 2*a*, the driver 1*e* moves downward along the axis line J1 of the piston 1*d* moving downward.

A lower end of the driver 1*e* that moves downward drives a driving member supplied to the driving passage 2*a*. The driving member that is driven by the driver 1*e* is ejected from an ejection port 2*b* at a lower end of the nose 2, thereby being driven into the workpiece. The piston 1*d* that moves downward hits against the damper 1*g*. Accordingly, the downward movement of the piston 1*d* and the driver 1*e* stops. The damper 1*g* absorbs an impact of the piston 1*d* when the piston 1*d* hits against the damper 1*g*. Owing to the presence of the damper 1*g*, the piston 1*d* is prevented from being damaged.

After the piston 1*d* stops moving downward, the wheel 3*a* continues to rotate in the direction indicated by the arrow R. Accordingly, an engagement portion P at a foremost position in the rotation direction of the wheel 3*a* engages an engaged portion L at an uppermost position of the driver 1*e*. As the wheel 3*a* continues to rotate, the engagement portion P pushes the engaged portion L. Each of the plurality of engagement portions P successively pushes a corresponding one of the plurality of engaged portions L. In this manner, the lifter 3 moves (returns) the driver 1*e* and the piston 1*d* to the standby position.

In the driving operation discussed above, when the piston 1*d* moves downward and the driver 1*e* drives a driving member, a counterforce is generated in the tool main body 11. The counterforce acts on the tool main body 11 upward (in a direction opposite to the driving direction, i.e., in an anti-driving direction) along the axis line J1 of the piston 1*d* moving in the up-down direction. Thus, an operation reaction force for rotating the driving tool 10 rearward and upward around the grip for the user to hold is generated.

In the first embodiment, the cylinder 1*c* is made of iron. A weight of the cylinder 1*c* is small compared to a case where the cylinder 1*c* is made of aluminum or resin. Owing to a large weight of the cylinder 1*c*, an upward deviation of the tool main body 11 occurred when the driving operation is performed can be relatively restrained. In other words, an operation reaction force occurred in the tool main body 11 can be relatively restrained. Furthermore, because of the weight of the cylinder 1*c* and the battery pack 16 arranged on a rear side of the grip 12, the tool main body 11 is well balanced, therefore maintaining the weight balance of the tool main body 11 in the front-rear direction in an appropriate and stable manner. Accordingly, a deviation of the tool main body 11 in the front-rear direction occurred when the driving operation is performed can be effectively restrained.

Furthermore, because of the large weight of the cylinder 1*c*, a total weight of component members housed in the housing upper portion 1*a* may be closer to that housed in the housing lower portion 1*b*. Accordingly, a center of gravity of the tool main body 11 may be positioned near the grip 12. As a result, an operability of the driving tool 10 can be improved when the user uses the driving tool 10. For example, when the driving tool 10 is used such that the axis line J1 of the piston 1*d* is directed in a horizontal direction, a weight balance of the driving tool 10 can be appropriately maintained in the driving direction.

As discussed above, the driving tool 10 includes the driver 1*e* that drives a driving member as shown in FIG. 3. The piston 1*d* is connected to the driver 1*e*. The cylinder 1*c* houses the driver 1*e* and the piston 1*d*. The driver 1*e* and the piston 1*d* moves along a longitudinal direction of the cylinder 1*c* owing to a gas pressure. The cylinder 1*c* is made of iron. Accordingly, the cylinder 1*c* is positioned on the axis line J1 along which the piston 1*d* moves or in the vicinity of the axis line J1. Because of the iron-made cylinder 1*c*, a weight of the piston 1*d* in the adjoining area of the axis line J1 is more than that of the cylinder 1*c* made of aluminum or resin. In addition, a reaction force against the movement of the piston 1*d* and the driving of the driver 1*e* can be effectively restrained. Therefore, a reaction force can be effectively restrained when a driving operation is performed.

As shown in FIG. 3, the cylinder 1*c* has an inner circumferential surface 1*j* along which the piston 1*d* is slidably. A surface treatment is not applied to the inner circumferential surface 1*j* of the cylinder 1*c*. Since the cylinder 1*c* is made of iron, an intensity of the inner circumferential surface 1*j* can be appropriately maintained without a need to apply the surface treatment to the inner circumferential surface 1*j*. Thus, a process for applying the heat treatment to the inner circumferential surface 1*j* of the cylinder 1*c* can be saved.

However, a heat treatment may be applied to the cylinder 1*c* to enhance the intensity of the cylinder 1*c*.

Next, a second embodiment of the present disclosure will be explained with reference to FIGS. 4 to 7. A driving tool 20 in the second embodiment includes a housing 21 instead of the housing 1 in the first embodiment. The housing 21 includes a housing upper portion 21*a* and a cylinder 21*c*. The housing 21 also includes a weight member 5. In the following explanation, descriptions of the members and configurations in common with the first embodiment are omitted by using the same reference numerals, and descriptions that differ from in the first embodiment will only be made in detail.

Figure 4:
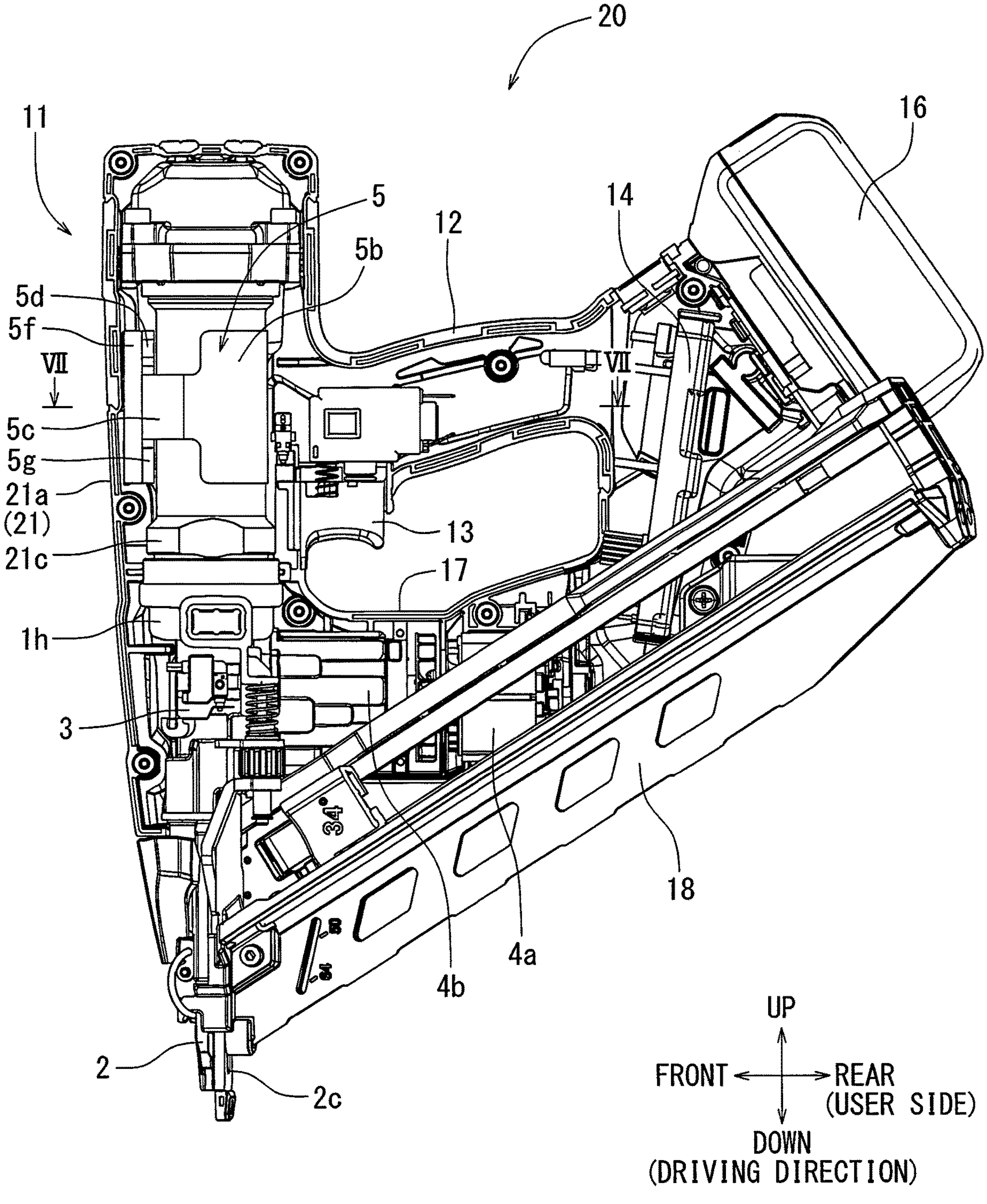
FIG. 4 is a left side view of a driving tool according to a second embodiment of the present disclosure.
Figure 5:
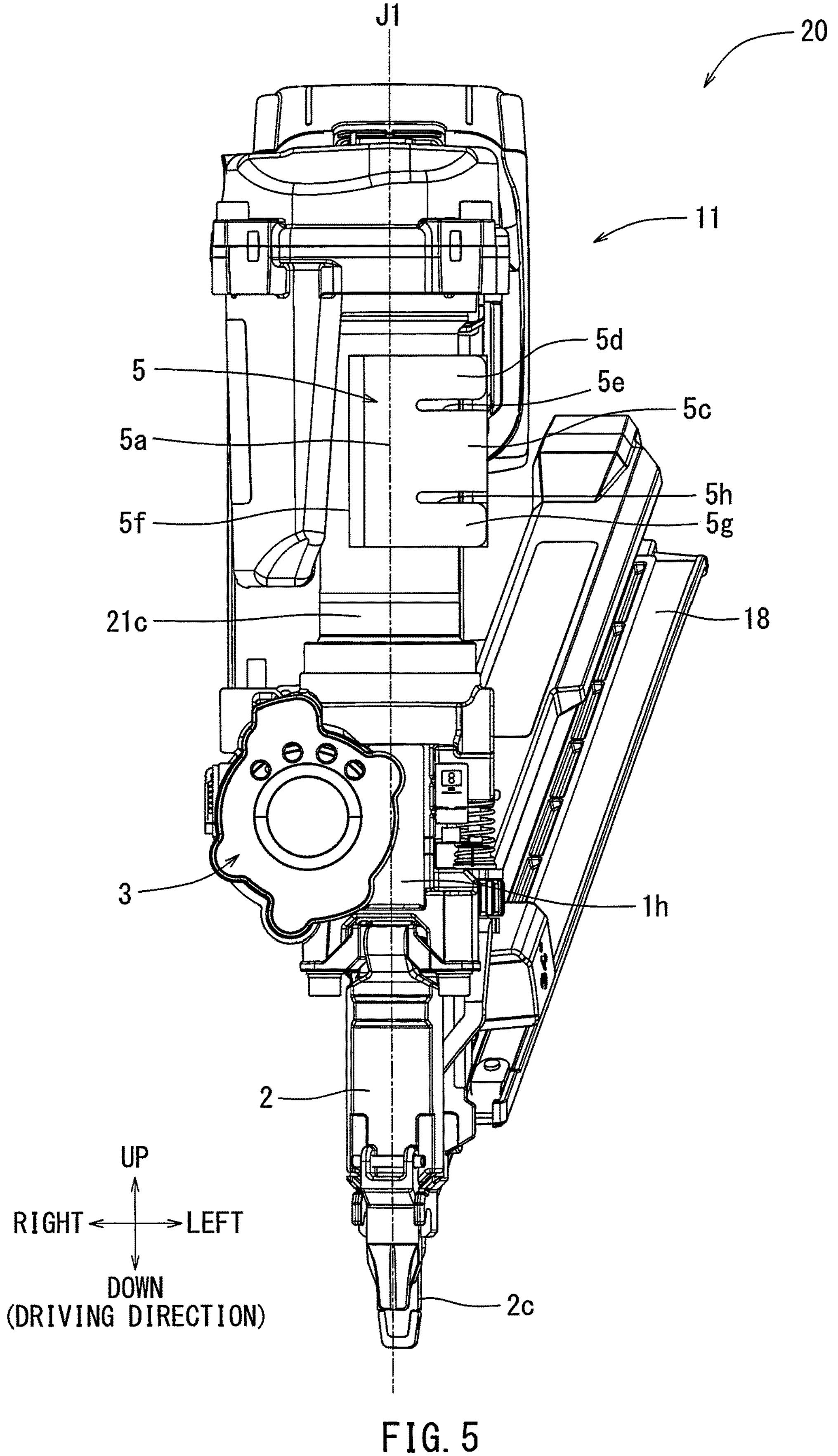
FIG. 5 is a front view of the driving tool without the housing.

As shown in FIGS. 4 and 5, the cylinder 21*c* is hosed in the housing upper portion 21*a*. The cylinder 21*c* is made of aluminum. A surface treatment such as a hard alumite treatment, is applied to an inner circumferential surface of the cylinder 21*c* to improve the intensity and wear resistance of the cylinder 21*c*.

As shown in FIGS. 4 and 5, the driving tool 20 includes the weight member 5 that is mechanically arranged in the housing upper portion 21*a*. The weight member 5 is made of iron. The weight member 5 increases a weight in the adjoining arear of the axis line J1 of the piston 1*d*. The weight member 5 is arranged on a front and left side of the cylinder 21*c*. Also, the weight member 5 is arranged within a range where the cylinder 21*c* extends in the up-down direction.

Figure 6:
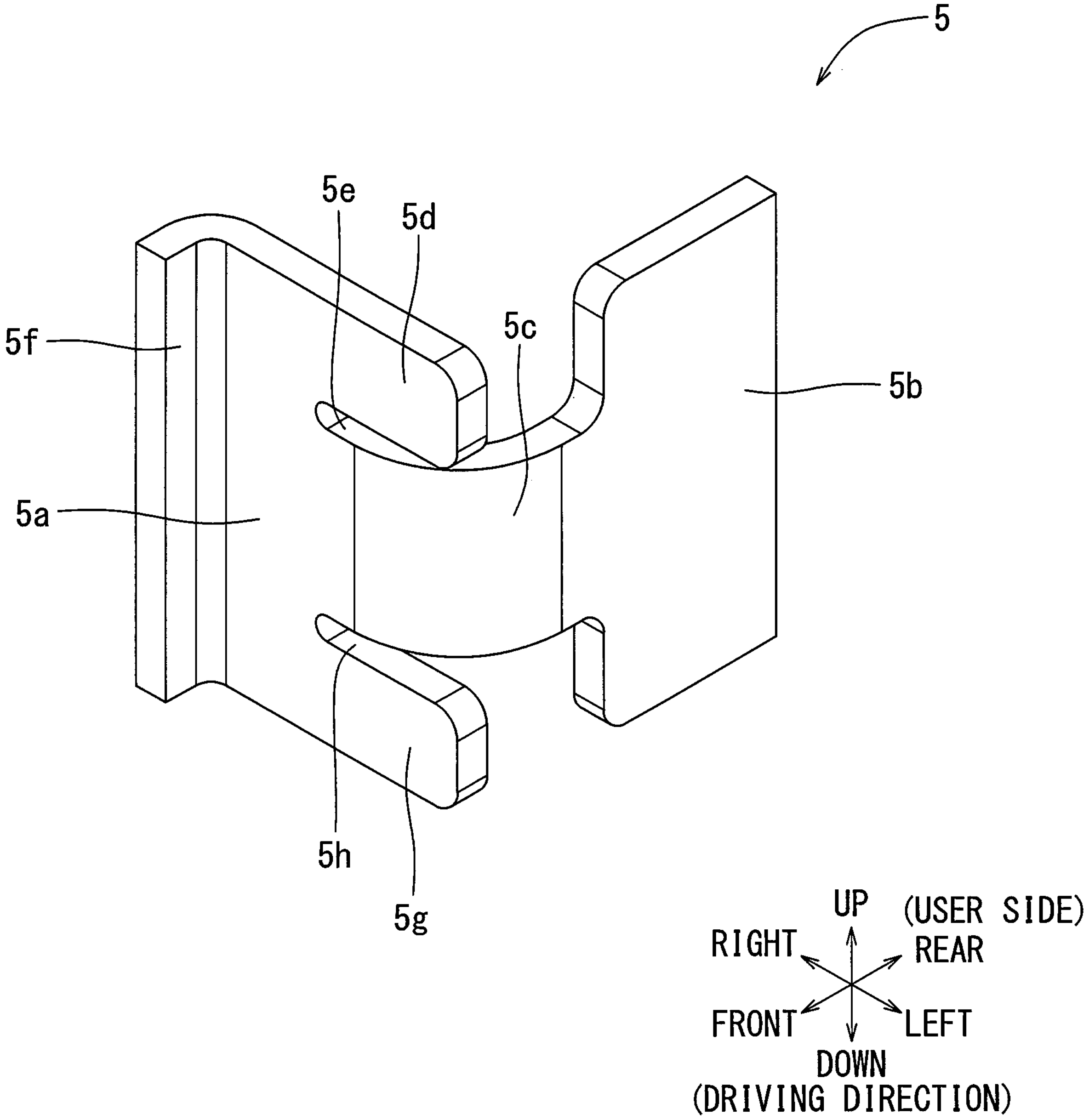
FIG. 6 is a perspective view of a weight member.

As shown in FIG. 6, the weight member 5 is a metal member that is formed in an approximately L shape in cross section by bending a sheet metal. The weight member 5 includes a front portion 5*a*, a left portion 5*b* and a bending portion 5*c*. The front portion 5*a*, the left portion 5*b*, and the bending portion 5*c* are continuously formed. The bending portion 5*c* connects a center portion of the front portion 5*a*, which is on a left side extending in the up-down direction, to a center portion of the left portion 5*b*, which is on a right side extending in the up-down direction. Furthermore, the weight member 5 includes an upper extending portion 5*d* and a lower extending portion 5*g*, both of which extend leftward from the front portion 5*a*. The upper extending portion 5*d* is above the bending portion 5*c*. An upper groove portion 5*e* is between the upper extending portion 5*d* and the bending portion 5*c*. The lower extending portion 5*g* is below the bending portion 5*c*. A lower groove portion 5*h* is between the lower extending portion 5*g* and the bending portion 5*c*. The weight member 5 includes a front protruding portion 5*f* that protrudes forward from a right end of the front portion 5*a*.

Figure 7:
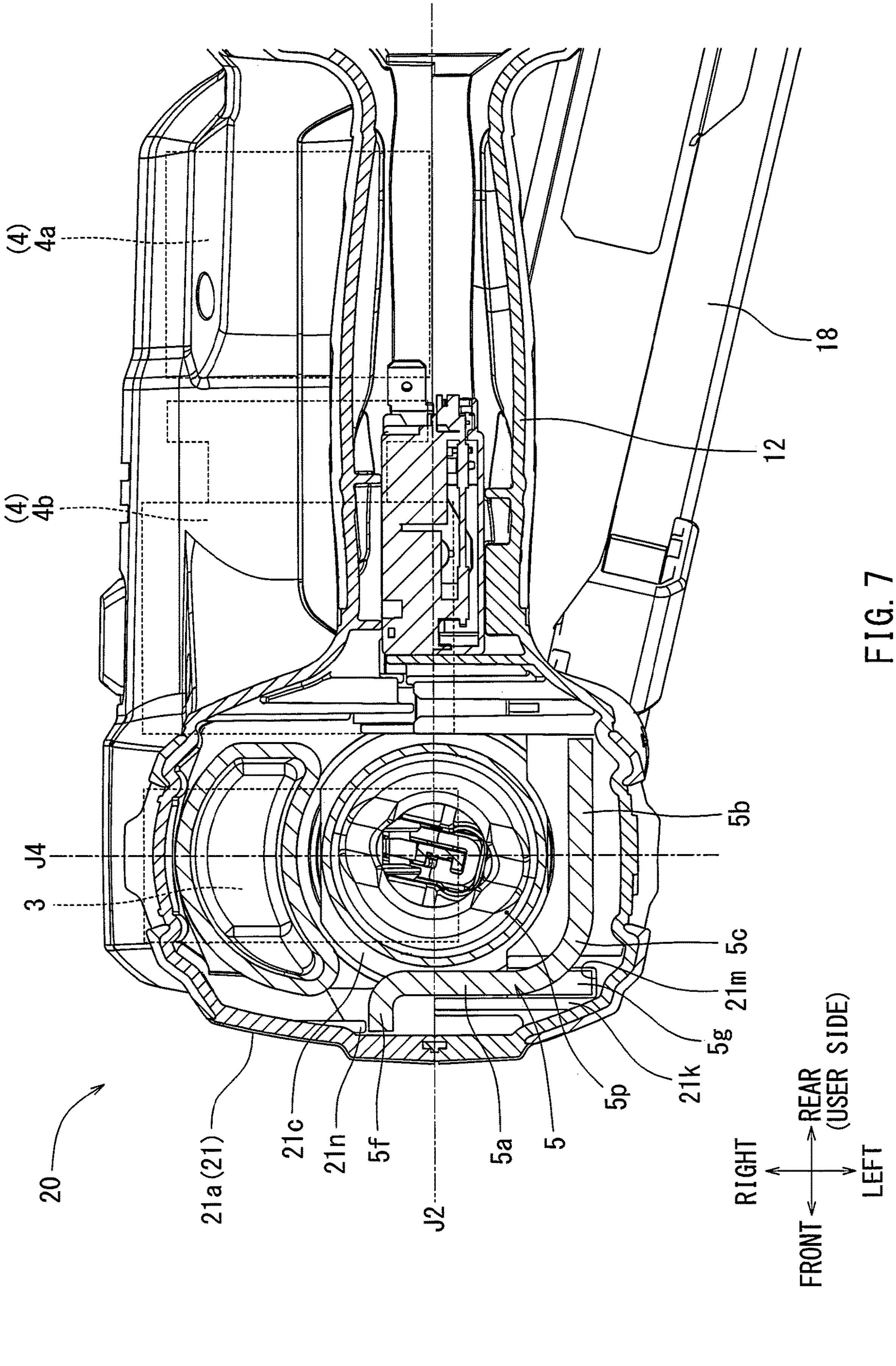
FIG. 7 is a cross-sectional view taken along line VII-VII of FIG. 4.

As shown in FIG. 7, the housing 21 includes a first rib 21*k* that protrudes rightward from a left side inner wall of the housing 21. The first rib 21*k* includes a recess 21*m* that is recessed in a leftward direction. The lower extending portion 5*g* of the weight member 5 is fitted into the recess 21*m*. The upper extending portion 5*d* of the weight member 5 is also fitted into the recess 21*m*. Because of this fitting arrangement, the weight member 5 is positioned with respect to the housing 21. The housing 21 also includes a second rib 21*n* that protrudes leftward from the inner wall of the housing 21 on its front side. The second rib 21*n* supports the front protruding portion 5*f* of the weight member 5 from the right. This arrangement prevents the weight member 5 from being disengaged from the recess 21*m*. The weight member 5 is also attached to the interior of the housing 21 in this manner.

As shown in FIG. 7, relating to a center line of the housing 21 in the front-rear direction (front-rear center J4), a weight of the weight member 5 on the front side is more than the rear side. In other words, a weight center 5*p* of the weight member 5 is positioned on a front side of the front-rear center J4 of the housing 21. Because of this weight arrangement, the weight member 5 is well balanced in weight with respect to component members arranged behind the housing 21 such as, for example, grip 12. Accordingly, a weight balance of the driving tool 20 in the front-rear direction can be appropriately and stably maintained relating to the housing 21. As a result, an operability of the driving tool 20 can be improved. Furthermore, a deviation of the driving tool 20 in the front-rear direction can be appropriately restrained when a driving operation of the driving tool 20 is performed.

Furthermore, relating to a center line of the grip 12 in the left-right direction (left-right center J2), a weight of the weight member 5 on its left side is larger than that on its right side. In other words, the weight center 5*p* of the weight member 5 is positioned on a left side of the left-right center J2 of the grip 12. Because of this weight arrangement, the weight member 5 is well balanced in weight with respect to component members disposed on a right side of the grip 12 such as, for example, the lifter 3 and the driving section 4. Accordingly, a weight balance of the driving tool 20 in the left-right direction can be appropriately and stably maintained relating to the grip 12, thus, improving an operability of the driving tool 20. Furthermore, a deviation of the driving tool 20 in the left-right direction can be appropriately restrained when a driving operation of the driving tool 20 is performed.

As discussed above, the driving tool 20 includes the driver 1*e* that drives a driving member. The piston 1*d* is connected to the driver 1*e*. The driver 1*d* and the piston 1*d* are housed in the cylinder 21*c*. The driver 1*d* and the piston 1*d* move in the up-down direction within the cylinder 21*c* owing to a gas pressure. The cylinder 21*c* is formed in a tubular shape extending in the up-down direction. The weight member 5 is arranged in the interior of the housing 21. Accordingly, the housing 22 is positioned in the vicinity of the axis line J1 of the piston 1*d* that moves in the up-down direction. Owing to the arrangement of the weight member 5, a weight of the housing 21 increases. Because of the weight increase of the housing 21 in the vicinity of the axis line J1 of the piston 1*d*, a reaction force against the movement of the piston 1*d* and the driving of the driver 1*e* can be appropriately restrained. Accordingly, a reaction force can be effectively restrained when a driving operation of the driving tool 20 is performed.

As shown in FIGS. 4 and 5, the weight member 5 is arranged around the cylinder 21*c*. The weight member 5 is arranged within a range where the cylinder 21*c* extends in the up-down direction. Accordingly, the weight member 5 can be arranged in the vicinity of the axis line J1 of the piston 1*d*. Because of this arrangement, when a driving operation of the driving tool 20 is performed, a reaction force can be reliably restrained by the presence of the weight member 5.

As shown in FIG. 7, the weight member 5 is fixed to the inner wall of the housing 21. Accordingly, the weight member 5 is integrally attached to the housing 21. Thus, the weight member 5 may not become loose within the housing 21.

As shown in FIG. 7, the grip 12 extends rearward from the housing 21. The weight member 5 is arranged such that the weight center 5*p* of the weight member 5 is positioned on a front side of the front-rear center J4 of the housing 21. Accordingly, the weight member 5 is positioned such that a weight of the weight member 5 on a side opposite to the grip 12 becomes large relating to the housing 21, therefore, maintain the weight balance of the driving tool 20 in the front-rear direction in an appropriately manner. As a result, a deviation of the driving tool 20 occurred when a driving operation of the driving tool 20 is performed can be effectively restrained.

As shown in FIG. 7, the grip 12 extends in a rearward direction from the housing 21. The lifter 3 moves the driver 1*e* upward. The lifter 3 is arranged on a left side or right side of the left-right center J2 of the grip 12 (on a first side of the left-right center J2). The weight member 5 is arranged such that the weight center 5*p* of the weight member 5 is disposed on a side opposite to the first side (on a second side of the left-right center J2) relating to the left-right center J2 of the grip 12. In other words, the weight member 5 is arranged such that a weight of the weight member 5 on the side opposite to the first side where the lifter 3 is disposed is large. Because of this weight arrangement, a weight balance of the tool main body 20 in the left-right direction relating to the grip 12 can be appropriately maintained. As a result, a deviation of the driving tool 20 occurred when a driving operation of the driving tool 20 is performed can be effectively restrained.

The above discussed embodiments may be modified in various ways. In the above embodiments, a heat treatment is applied to an iron-made cylinder. In addition to this, a surface polishing may be applied to an inner circumferential surface of the iron-made cylinder for suppressing wear of the cylinder.

In the first embodiment, the iron-made cylinder is arranged to increase a weight in the vicinity of the axis line of the piston. In the second embodiment, a weight member is arranged around the aluminum-made cylinder. Instead, a weight member may be arranged around an iron-made cylinder.

A number, a shape and a size of the weight member may be modified without limiting to the exemplified weight member 5. In the second embodiment, the weight member is disposed on a front side and on a left side of the cylinder. Instead, a weight member may be arranged along a whole circumference of the cylinder, or a weight member may be arranged at any arbitrary positions around the cylinder. A weight member may be arranged around the lower case within the lower case or around the nose, as long as the weight member is arranged within the housing. A weight member may be made of metal such as, for example, brass, copper, aluminum etc., without limiting to iron.

In the second embodiment, the weight member is fitted into the recess formed on the inner wall of the cylinder. Instead, the weight member may engage a claw formed on the inner wall so as to be fixed to the wall. Further, the weight member may be bonded to the inner wall of the housing.

In the second embodiment, the lifter is arranged on a right side of the left-right center of the grip. Instead, the lifter may be arranged on a left side of the left-right center of the grip. In this case, a weight center of the weight member is preferably positioned on a right side of the left-right center of the grip.

The driving tool 10 in the embodiments is one example of the driving tool according to one aspect or other aspects of the present disclosures. The driver le in the embodiments is one example of the driver according to one aspect or other aspects of the present disclosure. The piston 1*d* in the embodiments is one example of the piston according to one aspect or other aspects of the present disclosure. The cylinder 1*c* in the embodiments is one example of the cylinder according to one aspect or other aspects of the present disclosure.

The inner circumferential surface 1*j* in the embodiments is one example of the inner circumferential surface according to one aspect or other aspects of the present disclosure.

The housing 21 in the embodiments is one example of the housing according to one aspect or other aspects of the present disclosure. The weight member 5 in the embodiment is one example of the weight member according to one aspect or other aspects of the present disclosure.

The recess 21*m* in the embodiment is one example of the recess 21*m* according to one aspect or other aspects of the present disclosure.

The lifter 3 in the embodiments is one example of the lifter according to one aspect or other aspects of the present disclosure.

We claim:

1. A driving tool comprising:

a driver that drives a driving member in a driving direction;

a piston connected to the driver;

a cylinder configured to house the driver and the piston, the piston configured to be slidably movable within the cylinder;

a tubular-shaped housing configured to house the cylinder and extend in a longitudinal direction of the cylinder; and a weight member arranged inside the housing, wherein the weight member is fixedly arranged in a portion of a space surrounding on an outer circumference of the cylinder, within a range where the cylinder extends along the longitudinal direction of the cylinder.

2. The driving tool according to claim 1, wherein the weight member is configured to be attachable to an inner wall of the housing.

3. The driving tool according to claim 1, further comprising a grip extending from the housing in a rearward direction approximately perpendicular to the longitudinal direction of the cylinder, wherein the weight member is arranged such that a weight center of the weight member is positioned on a front side of a center line of the housing in a front-rear direction.

4. The driving tool according to claim 1, further comprising:

a grip extending from the housing in a rearward direction approximately perpendicular to the longitudinal direction of the cylinder; and a lifter that moves the driver in a direction opposite to the driving direction, wherein, the lifter is positioned on a first side of a left side or right side of a center line of the grip in a left-right direction approximately perpendicular to a direction in which the grip extends, and the weight member is arranged such that a weight center of the weight member is positioned on a second side opposite to the first side relating to the center line of the grip in the left-right direction.

5. The driving tool according to claim 1, wherein the cylinder is made of aluminum and includes an inner circumferential surface along which the piston is slidable, the inner circumferential surface of the cylinder is subjected to a hard alumite treatment.

6. The driving tool according to claim 1, wherein the weight member is formed in an approximately L shape in cross section by bending a sheet metal.

7. The driving tool according to claim 4, wherein the cylinder is made of iron.

8. The driving tool according to claim 1, wherein the weight member is made of any material of iron, brass, copper or aluminum.

9. The driving tool according to claim 1, wherein the weight member is configured to engage a claw formed on an inner wall of the housing.

10. The driving tool according to claim 1, wherein the weight member is configured to be bonded to an inner wall of the housing.

11. The driving tool according to claim 1, wherein the weight member is configured to restrain a reaction force when the driver drives the driving member.

12. The driving tool according to claim 1, wherein, the cylinder is made of iron and heat-treated, and the cylinder includes an inner circumferential surface along which the piston is slidable, the inner circumferential surface not being subjected to a surface treatment.

13. A driving tool comprising:

a driver that drives a driving member in a driving direction;

a piston connected to the driver;

a cylinder configured to house the driver and the piston, the piston configured to be slidably movable within the cylinder;

a tubular-shaped housing configured to house the cylinder and extend in a longitudinal direction of the cylinder; and a weight member arranged inside the housing and formed in an approximately L shape in cross section by bending a sheet metal, wherein the weight member includes a front portion, a left portion, and a bending portion that connects the front portion to the left portion such that the front portion, the left portion, and the bending portion are continuously formed.

14. The driving tool according to claim 13, wherein the weight member further includes an upper extending portion and a lower extending portion both of which extend from the front portion.

15. The driving tool according to claim 14, wherein the weight member is arranged circumferentially around the cylinder within a range where the cylinder extends along the longitudinal direction of the cylinder such that the upper extending portion, the bending portion, and lower extending portion are disposed in this order in the driving direction.

16. The driving tool according to claim 15, further comprising a rib extending from an inner wall of the housing, wherein the weight member is attachable to the inner wall of the housing via the rib.

17. The driving tool according to claim 16, wherein, the housing includes a first rib extending from the inner wall of the housing and including a recess, and the weight member is attachable to the inner wall of the housing by fitting the upper and lower extending portions of the weight member into the recess.

18. The driving tool according to claim 17, wherein, the housing includes a second rib extending from the inner wall of the housing, and the weight member is arranged such that a part of the front potion of the weight member is supported by the second rib.

* * * * *